(12) United States Patent
Li et al.

(10) Patent No.: US 9,310,957 B2
(45) Date of Patent: Apr. 12, 2016

(54) METHOD AND DEVICE FOR SWITCHING CURRENT INFORMATION PROVIDING MODE

(71) Applicant: TENCENT TECHNOLOGY (SHENZHEN) COMPANY LIMITED, Shenzhen, Guangdong Province (CN)

(72) Inventors: Wei Li, Shenzhen (CN); Bo Hu, Shenzhen (CN); Ting-Yong Tang, Shenzhen (CN); Ying Huang, Shenzhen (CN); Hui-Jiao Yang, Shenzhen (CN); Kai Zhang, Shenzhen (CN); Rui-Yi Zhou, Shenzhen (CN); Zheng-Kai Xie, Shenzhen (CN); Cheng Feng, Shenzhen (CN); Zhi-Pei Wang, Shenzhen (CN); Xi Wang, Shenzhen (CN); Yu-Lei Liu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/286,945

(22) Filed: May 23, 2014

(65) Prior Publication Data

US 2014/0257819 A1    Sep. 11, 2014

Related U.S. Application Data

(63) Continuation of application No. PCT/CN2014/070789, filed on Jan. 17, 2014.

(30) Foreign Application Priority Data

Mar. 7, 2013   (CN) .......................... 2013 1 0072436

(51) Int. Cl.

| | |
|---|---|
| G10L 21/00 | (2013.01) |
| G10L 13/00 | (2006.01) |
| G06F 3/048 | (2013.01) |
| G06F 1/16 | (2006.01) |
| G06F 3/038 | (2013.01) |

(52) U.S. Cl.
CPC .............. *G06F 3/048* (2013.01); *G06F 1/1694* (2013.01); *G06F 3/038* (2013.01); *G06F 2200/1637* (2013.01); *G06F 2203/0381* (2013.01)

(58) Field of Classification Search
USPC .............. 704/258, 260, 261, 270, 270.1, 275
See application file for complete search history.

(56) References Cited

U.S. PATENT DOCUMENTS 5,257,187 A * 10/1993 Suzuki ................ G06F 3/04892
704/10
6,081,780 A * 6/2000 Lumelsky ............... G10L 13/08
704/260

(Continued)

FOREIGN PATENT DOCUMENTS

WO PCT/CN2014/070789      1/2014

*Primary Examiner* — Edgar Guerra-Erazo
(74) *Attorney, Agent, or Firm* — Cheng-Ju Chiang

(57) ABSTRACT

A method for switching a current information providing mode is provided, wherein the method comprises steps as follows: user context information related to a user device is firstly collected. A current user context of the user device is then identified in accordance with the collected user context information, so as to an identified consequence data is the generated. A current information providing mode suitable for the current user context of the user device is subsequently switched according to the consequence data.

17 Claims, 14 Drawing Sheets

(56) References Cited

U.S. PATENT DOCUMENTS

| | | | | |
|---|---|---|---|---|
| 6,289,396 B1 * | 9/2001 | Keller | G06F 13/102 | 718/108 |
| 7,225,446 B2 * | 5/2007 | Whitton | G06F 9/30181 | 712/E9.035 |
| 7,412,393 B1 * | 8/2008 | De Fabbrizio | G06F 3/167 | 704/231 |
| 8,326,328 B2 * | 12/2012 | LeBeau | G10L 15/265 | 455/404.1 |
| 8,359,020 B2 * | 1/2013 | Lebeau | G10L 15/265 | 455/404.1 |
| 8,630,859 B2 * | 1/2014 | DiFabbrizio | G10L 15/22 | 704/270 |
| 2012/0035931 A1 * | 2/2012 | LeBeau | G10L 15/265 | 704/251 |

\* cited by examiner

METHOD AND DEVICE FOR SWITCHING CURRENT INFORMATION PROVIDING MODE

CROSS REFERENCE TO RELATED APPLICATIONS

The application is a U.S. continuation application under 35 U.S.C. §111(a) claiming priority under 35 U.S.C. §§120 and 365(c) to International Application No. PCT/CN2014/070789 filed on Jan. 17, 2014, which claims the priority benefit of Chinese patent application serial No. 201310072436.7, titled "method and device for switching current information providing mode" and filed on Mar. 7, 2013, the contents of which are incorporated by reference herein in their entirety for all intended purposes.

FIELD OF THE INVENTION

The present invention relates to computer technology, and more particularly to a method and a device for switching a current information providing mode of a user device.

BACKGROUND OF THE INVENTION

Typically, a user device can provide a display function to allow a user reading displayed documentary information provided from an internet browser or a documentary reader.

However, conventionally there are some problems for the user to read the documentary information, while the user is in a condition that is neither convenient nor suitable for reading, e.g. be in a moving vehicle. In the circumstance, the user has two choices: one is to quite reading (to obtain new information) to prevent the user's eyes form getting tired or overused, so as to keep the eyes in good health; the other choice is to continue the reading (to obtain new information) with tired eyes, so as to cause long-term damage to the eyes.

The user can not reap profits from both sides of the two choices, i.e. allowing the user obtaining new information without causing fatigue eyes or causing long-term damage to the eyes, by using a conventional user device in a circumstance not suitable for reading.

In other words, the conventional user device can not provide suitable displaying solutions in according with the current user context to allow the user obtaining new information without causing fatigue eyes or long-term damage to the eyes.

Therefore, there is a need of providing an improved method for switching a current information providing mode and the device for applying the same to obviate the drawbacks encountered from the prior art.

SUMMARY OF THE INVENTION

One object of the present invention provides a method for switching a current information providing mode and the device for applying the same to provide suitable displaying solutions in according with the current user context to allow the user obtaining new information.

In accordance with an aspect of the present invention a method for switching a current information providing mode is provided, wherein the method for switching a current information providing mode comprises steps as follows: user context information related to a user device is firstly collected. A current user context of the user device is then identified in accordance with the collected user context information, and an identified consequence data is then generated. A current information providing mode suitable for the current user context of the user device is subsequently switched according to the consequence data.

In accordance with another aspect, an device for switching a current information providing mode is provided, wherein the device comprises a user context information collecting module used to collect user context information of a user device, a context identifying module used to identify a current user context of the user device and then generate an identified consequence data according to the user context information, and a mode switching module used to switch a current information providing mode of the user device according to the identified consequence data.

In comparison with the conventional user device, the user device provided by the embodiments of the present invention can inspect the current user context (by collecting the user context information of the user device) and then switch its' current information providing mode according to the current user context, whereby a more comfortable user experience can be provided by the user device.

The above objects and advantages of the present invention will become more readily apparent to those ordinarily skilled in the art after reviewing the following detailed descriptions and accompanying drawings:

DETAILED DESCRIPTION OF PREFERRED EMBODIMENTS

It is to be noted that the following descriptions of preferred embodiments of this invention are presented herein for purpose of illustration and description only. It is not intended to be exhaustive or to be limited to the precise form disclosed.

The method and a device for switching a current information providing mode can be applied to a user device having an operation system that is typically adopted by a portable intellectual equipment. In other words, in some embodiments of the present invention, the user device may be a portable mobile terminal device, a palmtop computer, a tablet personal computer or the like. The device suitable for implementing the method of switching a current information providing mode may comprises a central process unit (CPU), a memory device, a transducer/sensor, a switch device, a power supply device, a clock signal generator, or the arbitrary combinations thereof.

Figure 1:
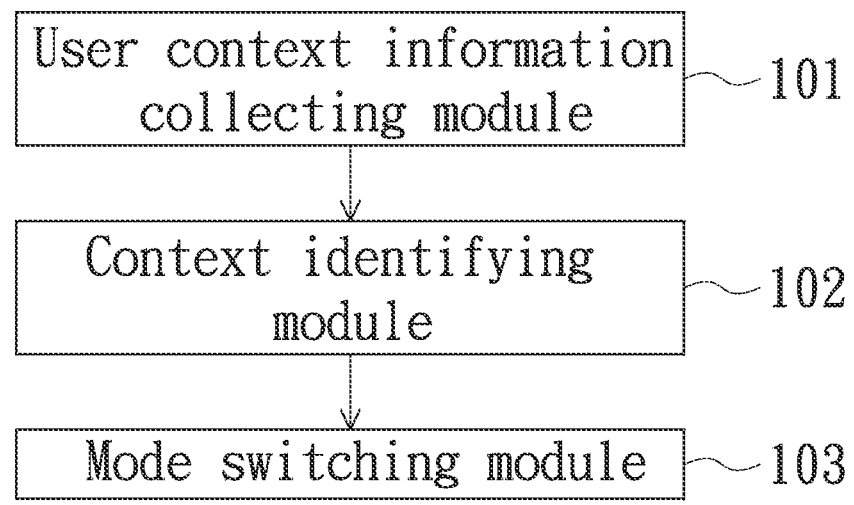
FIG. 1 is a block diagram illustrating an device for switching a current information providing mode, in accordance with a first embodiment of the present invention.

FIG. 1 is a block diagram illustrating a device for switching a current information providing mode, in accordance with a first embodiment of the present invention.

In the present embodiment, the device for switching a current information providing mode comprises a user context information collecting module 101, a context identifying module 102 and a mode switching module 103.

The user context information collecting module 101 is use to collect user context information of a user device that applying the device. In practice, real-time user context information of the user device can be collected by the user context information collecting module 101. In the present embodiment, the user context information of the user device is the entire or partial dynamical condition of the user device or the reaction of the user device in response to the dynamical condition. The collection or obtaining of the user context information of the user device can be implemented by a sensor (such as, a gyroscope, a gravity sensor, or an acceleration sensor). In addition the user context information collecting process can be associated with a clock signal generator to determine whether an action is performed by the user device or whether an impact, such as vibration, shaking force or the like, is imposed to during a time interval, so as to conclude some related information to indicate the current condition of the user device. For example, the user context information may indicate the number of vibration or shaking force that is imposed on the user device during the time interval.

The context identifying module 102 is then used to identify a current user context of the user device according to the user context information, so as to generate an identified consequence data. In short, the current condition of the user device can be determined and identified according to the collected user context information. For example, it can be indicated that the user device is subjected to vibration or shaken force, or otherwise is operated in a stable condition at a certain moment according to the user context information, and then the user context information can be concluded as to the identified consequence data generated by the context identifying module 102. In some embodiments of the present invention, two kinds of the identified consequence data can generated by the context identifying module 102 to indicate two kinds of current user context. One kind of the identified consequence data may indicate that the user device jolts due to vibration, shaken force or the combination thereof; and the other kind of identified consequence data may indicate that the user device is operated in a stable condition.

The mode switching module 103 is used to switch the current information providing mode of the user device according to the identified consequence data.

In the present embodiment, the current user context of the user device can be inspected by the user context information collecting module 101 and the context identifying module 102 (in a manner of collecting and identifying the user context information of the user device) and the current information providing mode of the user device is then switched according to the current user context, whereby a more comfortable way allowing the user receiving information is provided according to the current user context of the user device (that indicates the user device either jolts due to vibration, shaken force or the combination thereof or is operated in a stable condition).

Of noted that, the current information providing mode may provide different potential options to allow the user receiving information. For example, in a second embodiment, several different ways to providing information other than that disclosed by the first embodiment are provided, nevertheless most of the elements disclosed by the second embodiment are similar to that disclosed by the first embodiment.

In the present embodiment, the current information providing mode can be switched between two optional ways for displaying images, one is denominated as the first mode and the other is denominated as the second mode.

Two kinds of identified consequence data generated by the context identifying module 102 are then respectively associated with these two different current information providing mode to display images in different ways. For example, the first mode may be adapted (by the user device) to display images in a first way while the first kind of identified consequence data (which indicates that the user device jolts due to vibration, shaken force or the combination thereof) is generated; and the second mode may be adapted (by the user device) to display images in a second way while the second kind of identified consequence data (which indicates that the user device is operated in a stable condition is generated).

The mode switching module 103 may switch the current information providing mode from the first mode to the second mode.

The mode switching module 103 may switch the current information providing mode from the second mode to the first mode.

In the present embodiment, since the mode switching module 103 can switch the current information providing mode either from the first mode to the second mode or from the second mode to the first mode according to the identified consequence data that indicates the current user context of the user device, thus flexibility of allowing the user receiving information in a suitable way is provided by the user device.

Figure 2:
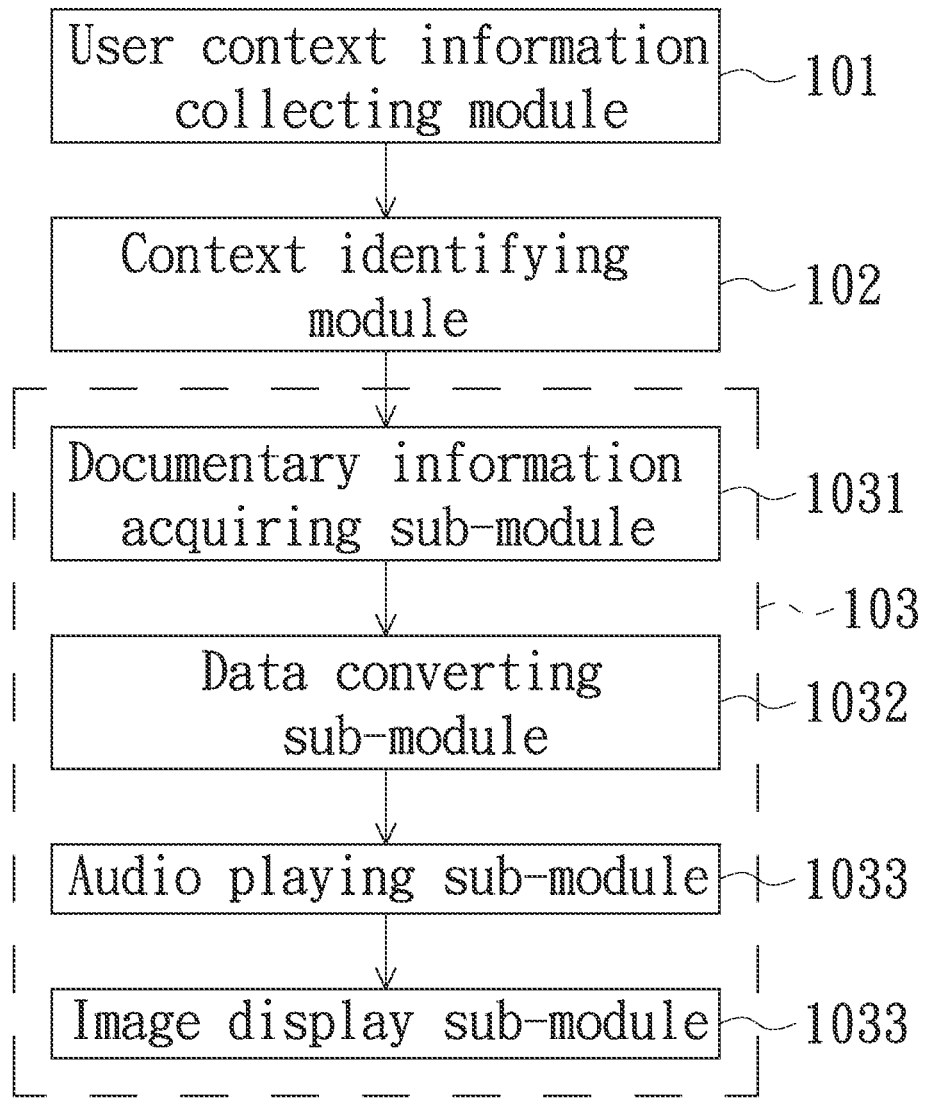
FIG. 2 is a block diagram illustrating a device for switching a current information providing mode, in accordance with a third embodiment of the present invention.

FIG. 2 is a block diagram illustrating a device for switching a current information providing mode, in accordance with a third embodiment of the present invention, wherein the device shown in FIG. 2 is similar to the device aforementioned in the first and the second embodiments except the arrangement of its mode switching module 103.

In the present embodiment, the mode switching module 103 comprises a documentary information acquiring sub-module 1031, a data converting sub-module 1032 and an audio playing sub-module 1033.

The documentary information acquiring sub-module 1031 is used to acquire documentary information that is displayed by the user device. In practice, the documentary information acquiring sub-module 1031 is used to acquire the documentary information of the web browser, the documentary reader or the digital magazine that is displaying on of the user device.

The data converting sub-module 1032 is used to convert the documentary information into audio data. Practically, the acquired documentary information can be identified and then converted into audio data by a Text To Speech (TTS) technology.

The audio playing sub-module 1033 is used to playing the audio data. In practice, the audio playing sub-module 1033 plays the audio data according to the data sequence of the documentary information acquired by the documentary information acquiring sub-module 1031.

In the present embodiment, since the documentary information that is displayed by the user device can be acquired by the documentary information acquiring sub-module 1031, and the acquired documentary information can be further converted into audio data by the data converting sub-module 1032 and then played by the playing sub-module 1033, thus when the user device is operated in a context that is not suitable for reading the documentary information, the user can still obtaining the documentary information by listing the audio data played by the audio playing sub-module 1033 without getting fatigue eyes or long-term damage to the eyes.

In some embodiment, a predetermined information providing mode, such as a first level mode or a second level mode, may be associated with the predetermined user contexts that are respectively identified in corresponding to different predetermined levels of the vibration or shaken force, whereby the current information providing mode can be switched there between. For example, if the first level mode is associated with the predetermined user context of low level vibration or shaken force, and the current information providing mode of the user device is set at the first level mode, while the current user context indicates that the user device is operated at a condition with low level vibration or shaken force, thus it means that the user device is operated with a suitable information providing mode. In this case, no switch may be performed. Otherwise if the second level mode is associated with the predetermined user context of high level vibration or shaken force, and the current information providing mode of the user device is set at the second level mode, while the current user context indicated that the user device is operated at a condition with low level vibration or shaken force, the user device is operated with a unsuitable information providing mode.

In this case, the current information providing mode of the user device should be switched from the second mode to the first level mode. And by this approach, a more suitable information providing mode can be provided in corresponding to the practical user context currently inspected and identified by the user device, so as to satisfy the user's requirement better.

In the present embodiment, the audio playing sub-module 1033 further functions to halt or terminate the playing of the audio data, when it is necessary to switch the current information providing mode from the second level mode to the first level mode.

The mode switching module 103 further comprises an image display sub-module 1034 used to display the documentary information.

Accordingly when it is necessary to switch the current information providing mode from the second level mode to the first level mode, the playing of the audio data is halted or terminated by the audio playing sub-module 1033, and the documentary information is displayed by the image display sub-module 1034. In other word, the current information providing mode can be switched to provide a suitable way allowing the user reading the documentary information according to the practical user context.

Figure 3:
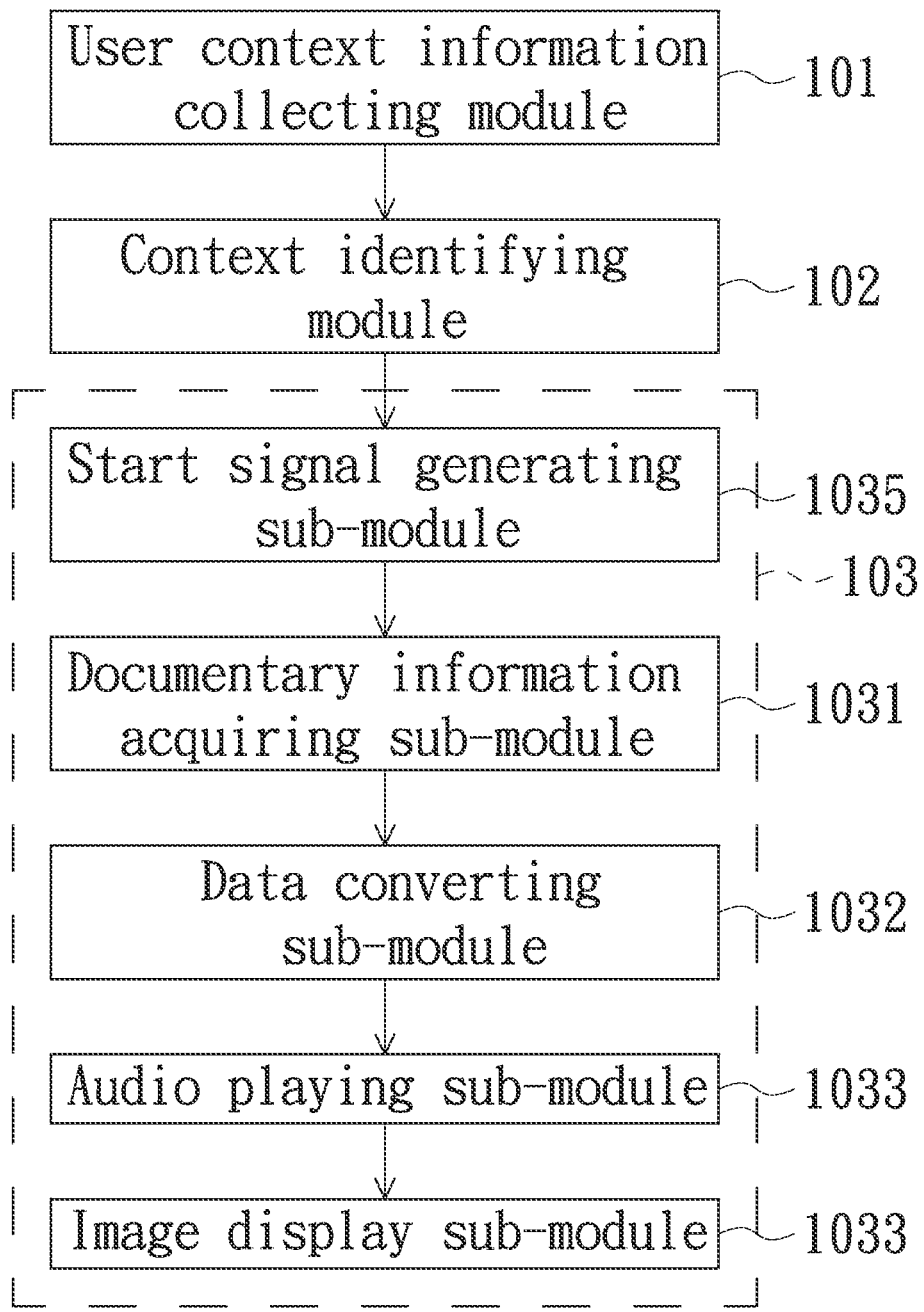
FIG. 3 is a block diagram illustrating a device for switching a current information providing mode, in accordance with a fourth embodiment of the present invention.

FIG. 3 is a block diagram illustrating a device for switching a current information providing mode, in accordance with a fourth embodiment of the present invention, wherein the device shown in FIG. 3 is similar to the device aforementioned in one of the first, the second and the third embodiments except the arrangement of the mode switching module 103.

In the present embodiment, the mode switching module 103 further comprises a start signal generating sub-module 1035.

The start signal generating sub-module 1035 is used to response the user's first command in a manner of generating a start signal to indicate the start point from which a portion of the documentary information should be converted in to audio data.

The documentary information acquiring sub-module 1031 is used to acquire documentary information that is displayed by the user device from the position where the start point indicates.

For example, the start signal is generated to response the click operations used to get a screen point for a click a position to select a start point on the documentary information that the user is interested, and the portion of the documentary information following the start point should be converted into audio data.

In the present embodiment, since the start signal used to indicate the user device when and where to start to convert the documentary information can be directly generated by the user's click operations, thus the user can directly command the user device to convert the portion of the documentary information that he or she desires to read into audio data according to his or her own practical demands, whereby the user can obtain the audio data converted from the desired portion of the documentary information (e.g. the unread portion of the documentary information, instead of that having been read by the user).

Besides, in the present embodiment, since the documentary information is marked by the start point using the start signal generating sub-module 1035, and the portion of documentary information following the start point that the user desires to read can be converted into audio data by the documentary information acquiring sub-module 1031 and the data converting sub-module 1032, thus mere the portion of the documentary information can be converted into audio data, and the unnecessary portion of the documentary information that has been read by the user before can be omitted. As a result, the user can obtain continuous and necessary information more conveniently. For example, after a portion of a document has been read by a user, when the user device jolts badly due to vibration, shaken force or the combination thereof during the reading, a start signal can be generated immediately at the position where the user clicks, and the portion of the document following the start signal is then identified and subsequently converted into audio data. By this approach, the user can continue to obtain information from the document by the user device. In other words, the converted audio data does not comprise information about the portion of the document that has been read by the user.

Figure 4:
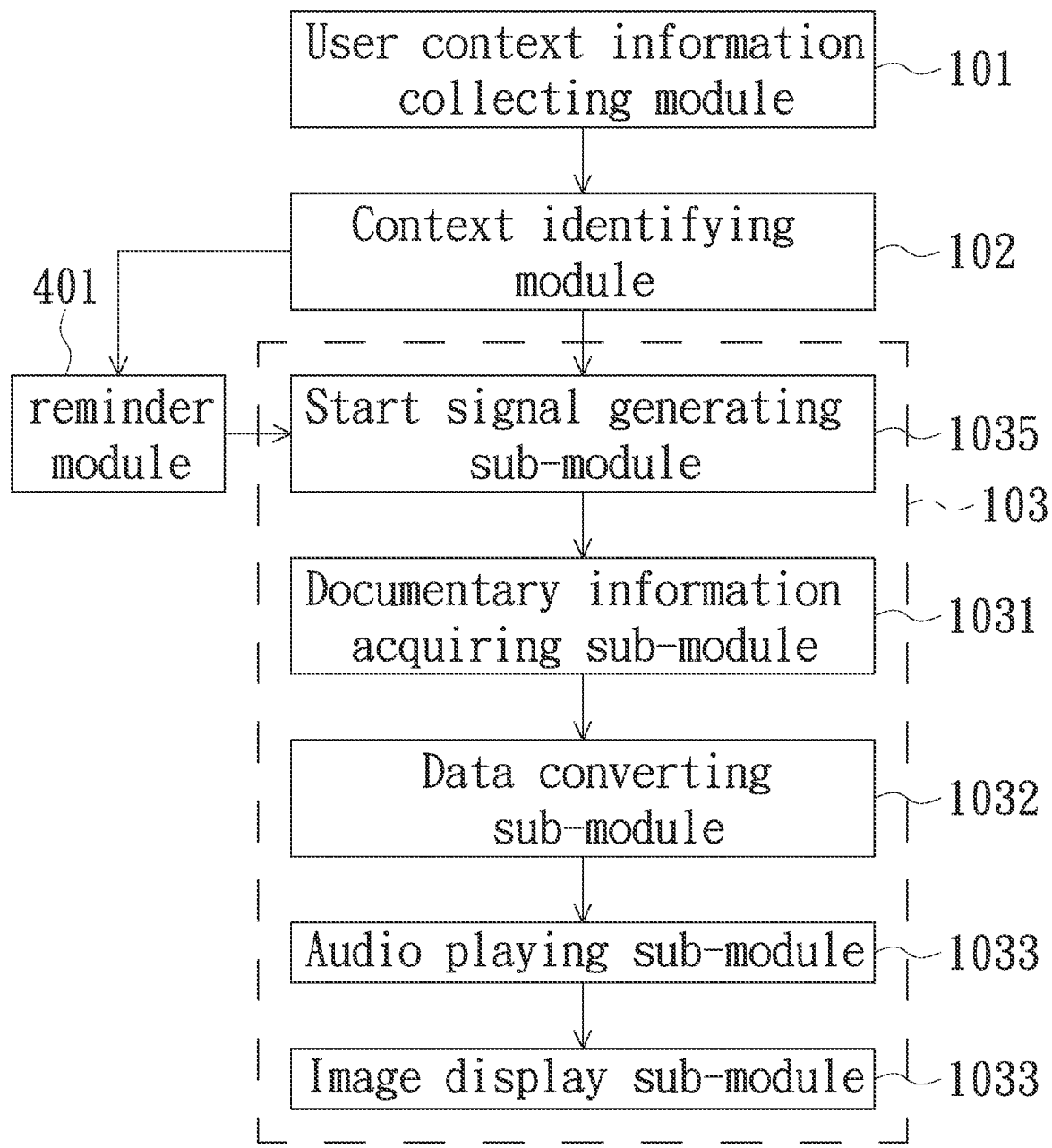
FIG. 4 is a block diagram illustrating a device for switching a current information providing mode, in accordance with a fifth embodiment of the present invention.

FIG. 4 is a block diagram illustrating a device for switching a current information providing mode, in accordance with a fifth embodiment of the present invention, wherein the device shown in FIG. 4 is similar to the device aforementioned in the first, the second, the third and the fourth embodiments, except as follows:

In the present embodiment, the device further comprises a reminder module 401.

The reminder module 401 is used to generate an alarm signal for warning the user. In other words, the reminder module 401 is used to generate an alarm signal to remind the user whether or not to switch the current information providing mode of the user device. In practice, an alarm signal may be generated to remind the user while the identified consequence data indicates that the user device is suitable for the first level mode. The alarm signal may be provided in a text format, a picture format, an audio format or a video format. When the alarm signal is provided in a text format, text massage may be displayed on the reminder module 401. When the alarm signal is provided in a picture format, an audio format or a video format, an icon, sounds alarm or other video images may be provided by the reminder module 401.

The mode switching module 103 is used to response the user's second command in corresponding to the alarm signal with a manner of switching the current information providing mode of the user device according to the identified consequence data.

In the present embodiment, since the reminder module 401 can generate an alarm signal to remind the user that the currently inspected/identified user context is comply with a predetermined user context of the user device, thus the user can switch the current information providing mode of the user device earlier to an information providing mode suitable for the current user context, so as to prevent the user from reading the documentary information on the jolty user device that may cause fatigue eyes or long-term damage to the eyes.

The devices disclosed by the first, the second, the third, the fourth and the fifth embodiments may further comprise an initial signal receiving sub-module embedded in the user context information collecting module 101.

The initial signal receiving sub-module (not shown) is used to receive an initial signal generated by the user device when the documentary information is displayed thereon.

The user context information collecting module 101 is used to collect the user context information of the user device according to the initial signal received by the initial signal receiving sub-module.

By adopting the initial signal receiving sub-module to receive the initial signal, the user context information collecting module 101 can be turn on to collect the user context information of the user device on time. In other words, the user context information of the user device is merely inspected and identified by the user context information collecting module 101 during the time interval when the documentary information is displayed on the user device; and the user context information collecting module 101 may not function to inspect the user context information of the user device when the documentary information is not displayed on the user device. Such that, the data processing loading of the user context information collecting module 101 can be significantly reduced, and the CPU and memory resource of the user device can be thus reserved.

Figure 5:
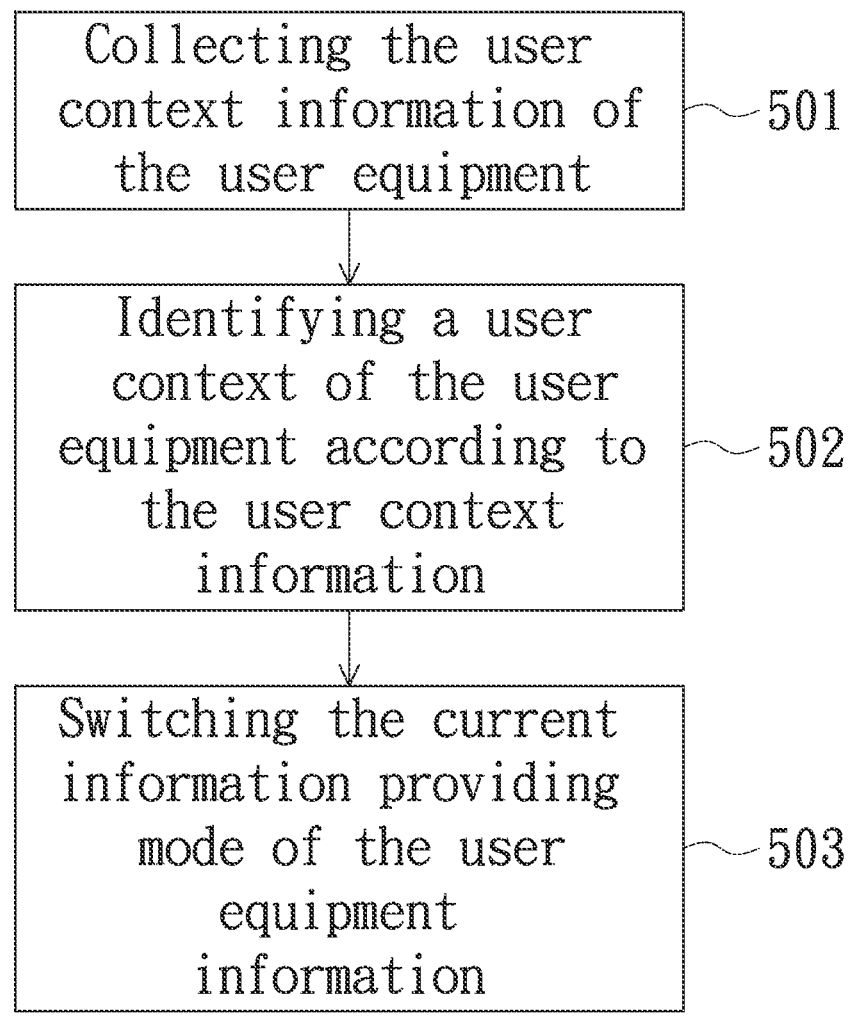
FIG. 5 is a process diagram illustrating a method for switching a current information providing mode, in accordance with the first embodiment of the present invention.

FIG. 5 is a process diagram illustrating a method for switching a current information providing mode, in accordance with the first embodiment of the present invention.

The method for switching a current information providing mode comprises steps as follows:

Referring to step 501, the user context information of the user device is collected by the user context information collecting module 101. In practice, real-time user context information of the user device can be collected by the user context information collecting module 101. In the present embodiment, the user context information of the user device is the entire or partial dynamical condition of the user device or the reaction of the user device in response to the dynamical condition. The collection or obtaining of the user context information of the user device can be implemented by a sensor (such as, a gyroscope, a gravity sensor, or an acceleration sensor). In addition the user context information collecting process can be associated with a clock signal generator to determine whether an action is performed by the user device or whether an impact, such as vibration, shaking force or the like, is imposed to during a time interval, so as to conclude some related information to indicate the current condition of the user device. For example, the user context information may indicate the number of vibration or shaking force that is imposed on the user device during the time interval.

Referring to step 502, a current user context of the user device is then identified by the context identifying module 102 according to the user context information, so as to generate an identified consequence data. In short, the current condition of the user device can be determined and identified according to the collected user context information. For example, it can be indicated that the user device is subjected to vibration or shaken force, or otherwise is operated in a stable condition at a certain moment according to the user context information, and then the user context information can be concluded as to the identified consequence data generated by the context identifying module 102. In some embodiments of the present invention, two kinds of the identified consequence data can generated by the context identifying module 102 to indicate two kinds of current user context. One kind of the identified consequence data may indicate that the user device jolts due to vibration, shaken force or the combination thereof; and the other kind of identified consequence data may indicate that the user device is operated in a stable condition.

Referring to step 503, the current information providing mode of the user device is switched by the mode switching module 103 according to the identified consequence data.

In the present embodiment, the current user context of the user device can be inspected by the user context information collecting module 101 and the context identifying module 102 (in a manner of collecting and identifying the user context information of the user device) and the current information providing mode of the user device is then switched according to the current user context, whereby a more comfortable way allowing the user receiving information is provided according to the current user context of the user device (that indicates the user device either jolts due to vibration, shaken force or the combination thereof or is operated in a stable condition).

Figure 6A:
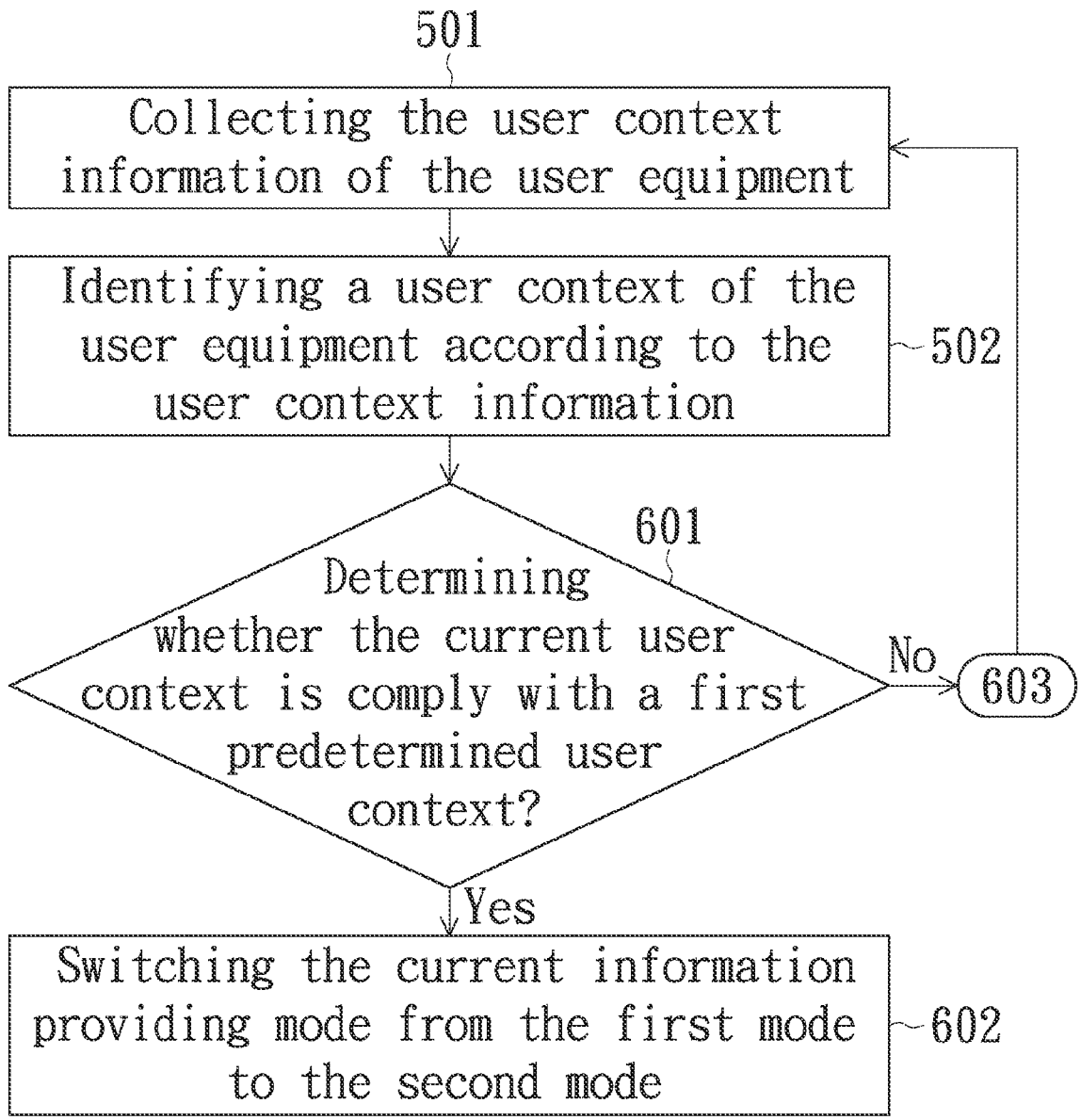
FIGS. 6A-6B are process diagrams illustrating a method for switching a current information providing mode, in accordance with the second embodiment of the present invention.
Figure 6B:
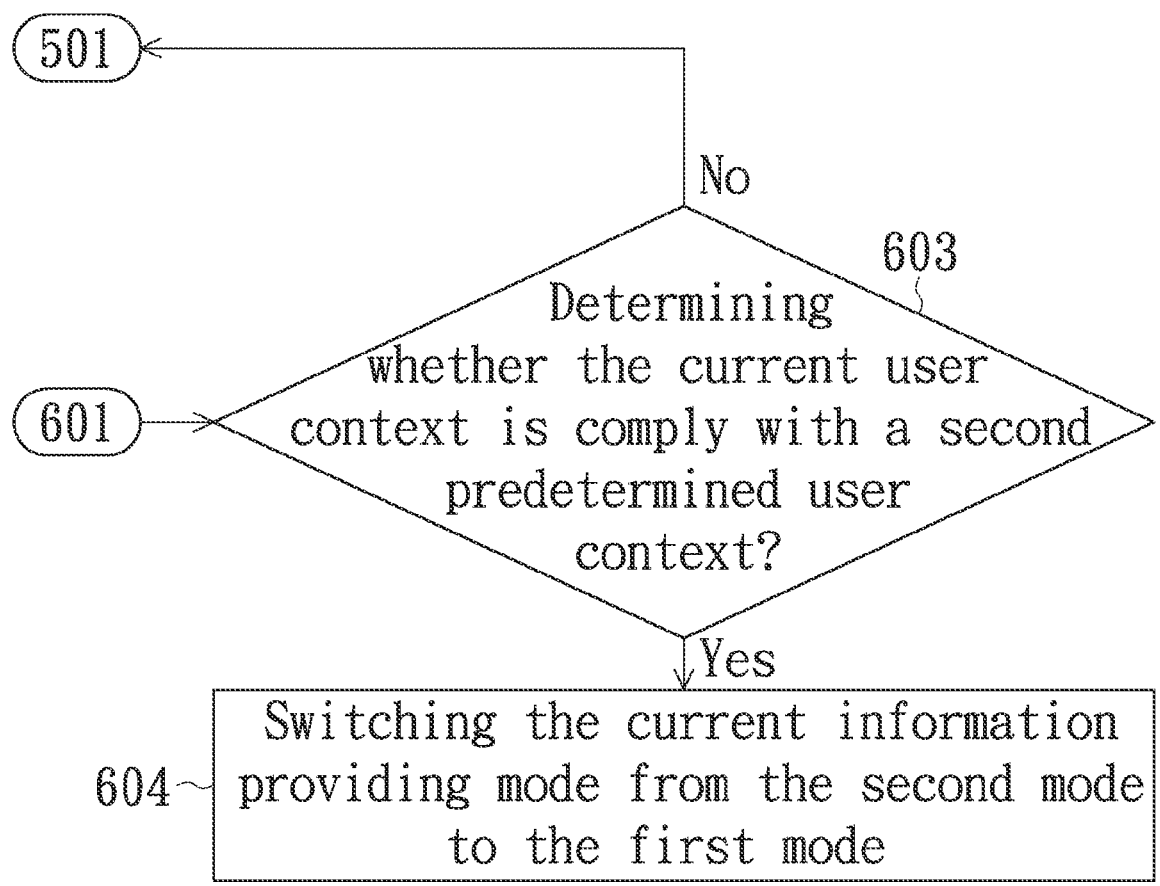

FIGS. 6A-6B are process diagrams illustrating a method for switching a current information providing mode, in accordance with the second embodiment of the present invention. The steps applied to the first embodiment are similar to that applied to the second embodiment, except as follows:

In the present embodiment, the current information providing mode can be switched between two optional ways for displaying images, one is denominated as the first mode and the other is denominated as the second mode.

Two kinds of identified consequence data generated by the context identifying module 102 are then respectively associated with these two different current information providing mode to display images in different ways. For example, the first mode may be adapted (by the user device) to display images in a first way while the first kind of identified consequence data (which indicates that the user device jolts due to vibration, shaken force or the combination thereof) is generated; and the second mode may be adapted (by the user device) to display images in a second way while the second kind of identified consequence data (which indicates that the user device is operated in a stable condition is generated).

Next, the current information providing mode of the user device is switched according to the identified consequence data (similar to the step 503 depicted in FIG. 5). In the present embodiment, the process for switching the current information providing mode comprises steps as follows (see FIGS. 6A-6B):

Referring to step 601, a test is performed to determine whether the current user context of the user device is comply with the first predetermined user context that may make the context identifying module 102 generating the first kind of identified consequence data. If the answer is "yes", proceed to the step 602; or if the answer is "No", proceed to the step 603.

Referring to step 602, the current information providing mode is switched from the first mode to the second mode by the mode switching module 103.

Referring to step 603, a test is performed to determine whether the current user context of the user device is comply with the second predetermined user context that may make the context identifying module 102 generating the second kind of identified consequence data. If the answer is "yes", proceed to the step 604; or if the answer is "No", return to the step 501.

Referring to step 604, the mode switching module 103 is used to switch the current information providing mode from the second mode to the first mode.

In the present embodiment, since the mode switching module 103 can switch the current information providing mode either from the first mode to the second mode or from the second mode to the first mode according to the identified consequence data that indicates the current user context of the user device, thus flexibility allowing the user receiving information in a suitable way is provided by the user device.

Figure 7A:
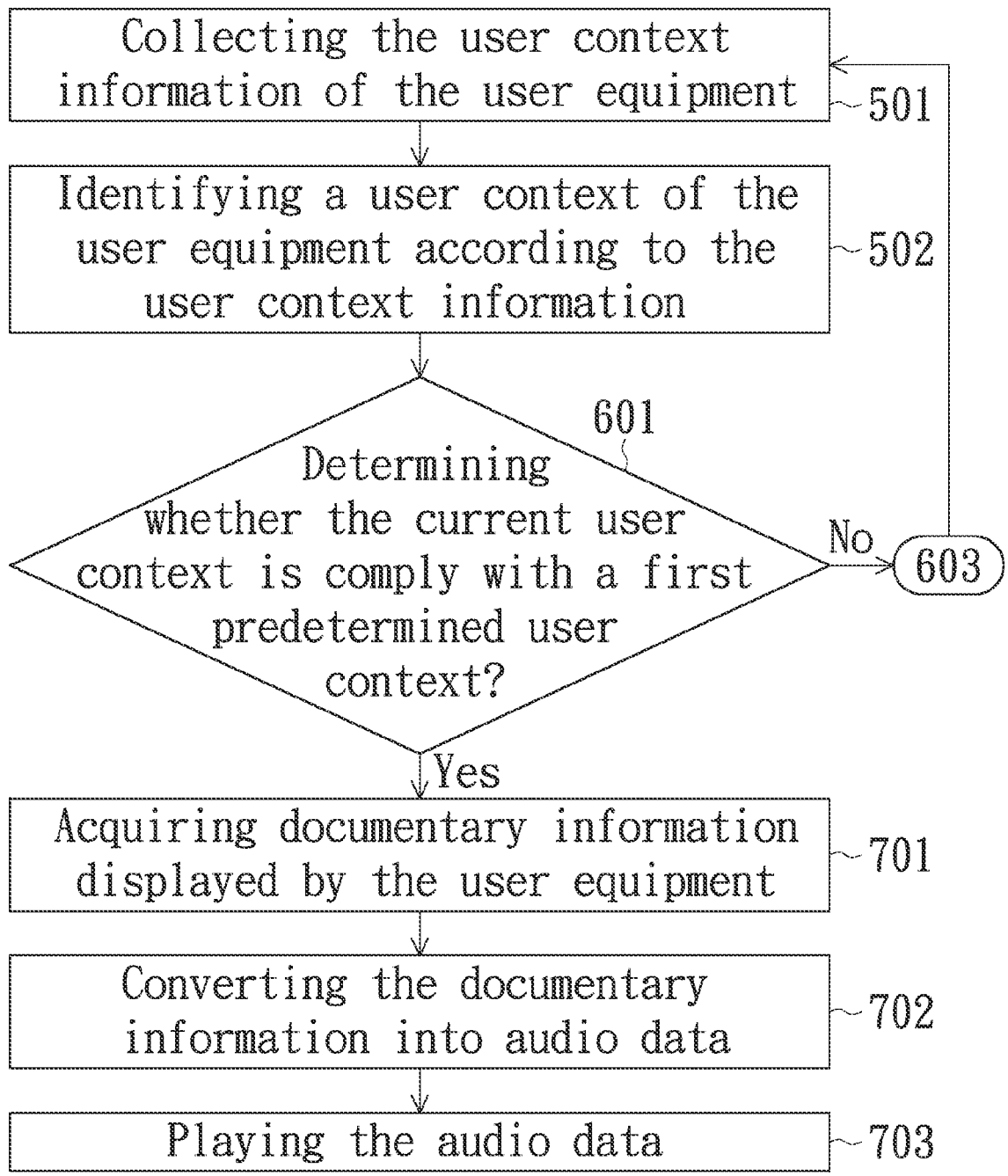
FIGS. 7A-7B are process diagrams illustrating a method for switching a current information providing mode, in accordance with the third embodiment of the present invention.
Figure 7B:
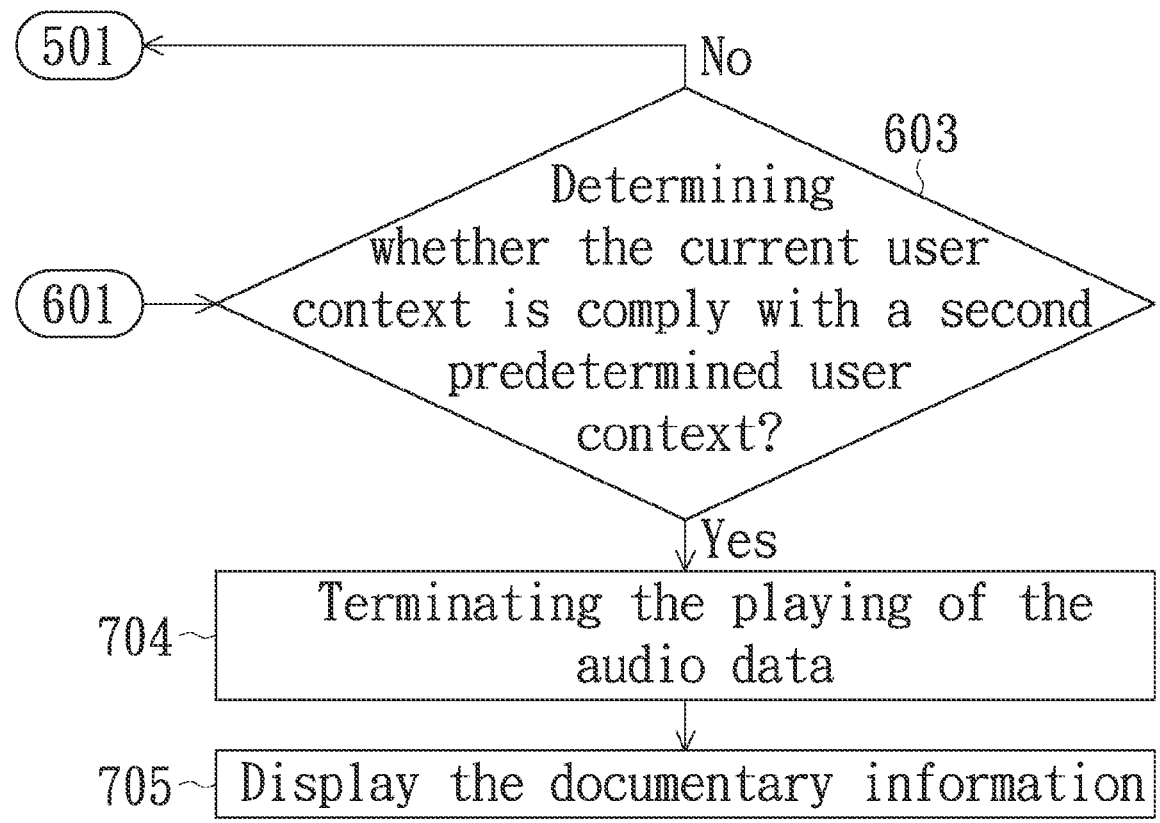

FIGS. 7A-7B are process diagrams illustrating a method for switching a current information providing mode, in accordance with the third embodiment of the present invention. The steps applied to the third embodiment are similar to that applied to the first embodiment or that applied to the second embodiment, except as follows:

In the present embodiment, the first mode that is associated with the first predetermined user context is a documentary information display mode (the user can obtain information by reading the documentary information displayed on the user device) and the second mode that is associated with the second predetermined user context is an audio mode (the user can obtain information by listening to the sounds message provided by the user device).

The process of switching the current information providing mode from the first mode to the second mode (similar to the step 602 depicted in FIG. 6A) comprises steps as follows:

Referring to step 701, the documentary information that is displayed by the user device is acquired by the documentary information acquiring sub-module 1031. In practice, the documentary information acquiring sub-module 1031 is used to acquire the documentary information of the web browser, the documentary reader or the digital magazine that is displaying on of the user device.

Referring to step 702, the documentary information is converted into audio data by the data converting sub-module 1032. Practically, the acquired documentary information can be identified and then converted into audio data by a Text To Speech (TTS) technology.

Referring to step 703, the audio data is played by the audio playing sub-module 1033. In practice, the audio playing sub-module 1033 plays the audio data according to the data sequence of the documentary information acquired by the documentary information acquiring sub-module 1031.

In the present embodiment, since the documentary information that is displayed by the user device can be acquired by the documentary information acquiring sub-module 1031, and the acquired documentary information can be further converted into audio data by the data converting sub-module 1032 and then played by the playing sub-module 1033, thus when the user device is operated in a context that is not suitable for reading the documentary information, the user can still obtaining the documentary information by listing the audio data played by the audio playing sub-module 1033 without getting fatigue eyes or long-term damage to the eyes.

In some embodiment, a predetermined information providing mode, such as a first level mode or a second level mode, may be associated with the predetermined user contexts that are respectively identified in corresponding to different predetermined levels of the vibration or shaken force, whereby the current information providing mode can be switched there between. For example, if the first level mode is associated with the predetermined user context of low level vibration or shaken force, and the current information providing mode of the user device is set at the first level mode, while the current user context indicates that the user device is operated at a condition with low level vibration or shaken force, thus it means that the user device is operated with a suitable information providing mode. In this case, no switch may be performed. Otherwise if the second level mode is associated with the predetermined user context of high level vibration or shaken force, and the current information providing mode of the user device is set at the second level mode, while the current user context indicated that the user device is operated at a condition with low level vibration or shaken force, the user device is operated with a unsuitable information providing mode.

In this case, the current information providing mode of the user device should be switched from the second mode to the first level mode. And by this approach, a more suitable information providing mode can be provided in corresponding to the practical user context currently inspected and identified by the user device, so as to satisfy the user's requirement better.

In the present embodiment, the process of switching the current information providing mode from the second mode to the first mode (similar to the step 604 depicted in FIG. 6 B) comprises steps as follows:

Referring to step 704, the playing of the audio data is halted or terminated by the audio playing sub-module 1033.

Referring to step 705, the documentary is displayed by the information the image display sub-module 1034.

Accordingly when it is necessary to switch the current information providing mode from the second level mode to the first level mode, the playing of the audio data is halted or terminated by the audio playing sub-module 1033, and the documentary information is displayed by the image display sub-module 1034. In other word, the current information providing mode can be switched to provide a suitable way allowing the user reading the documentary information according to the practical user context.

Figure 8A:
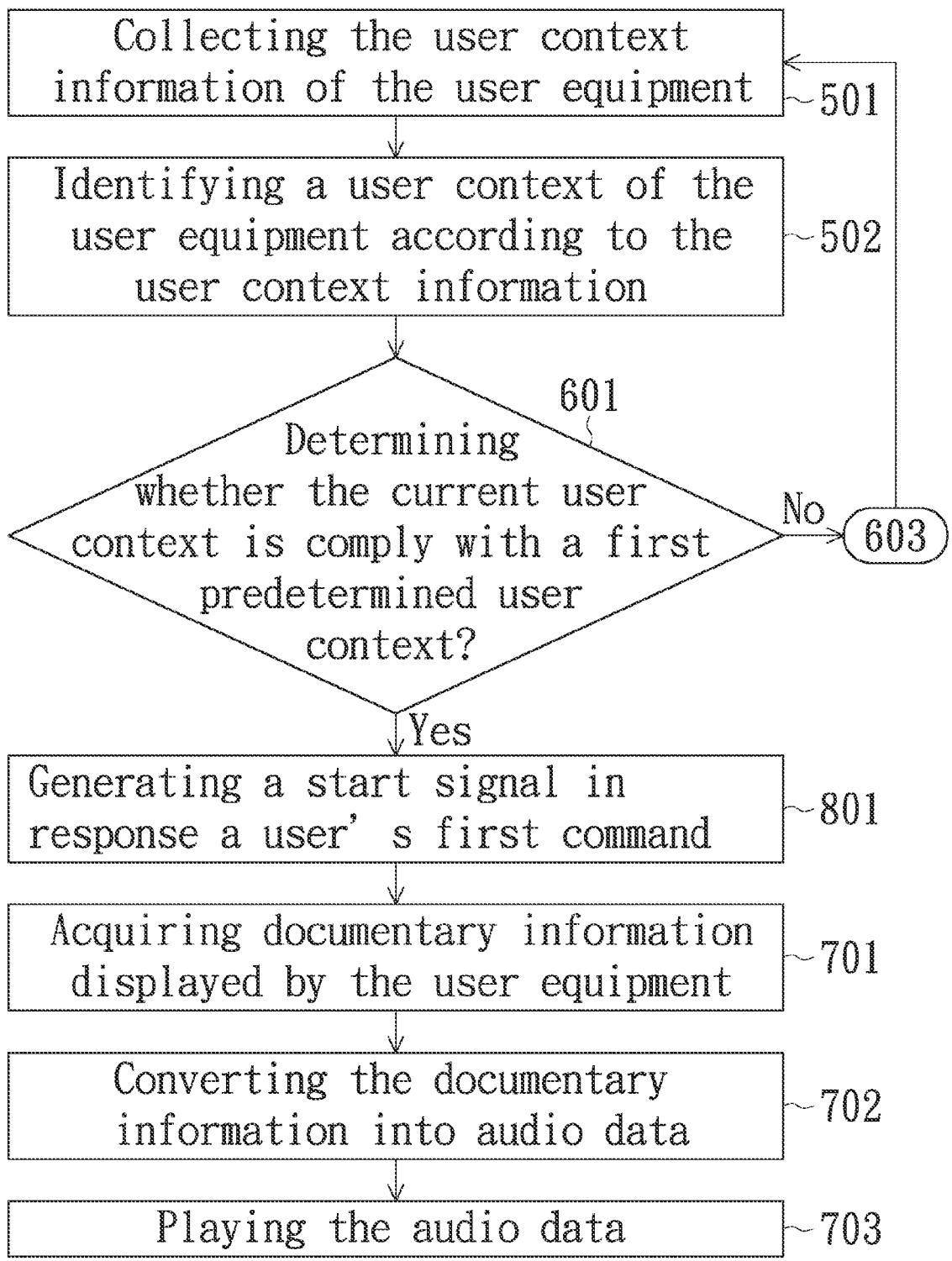
FIGS. 8A-8B are process diagrams illustrating a method for switching a current information providing mode, in accordance with the fourth embodiment of the present invention.
Figure 8B:
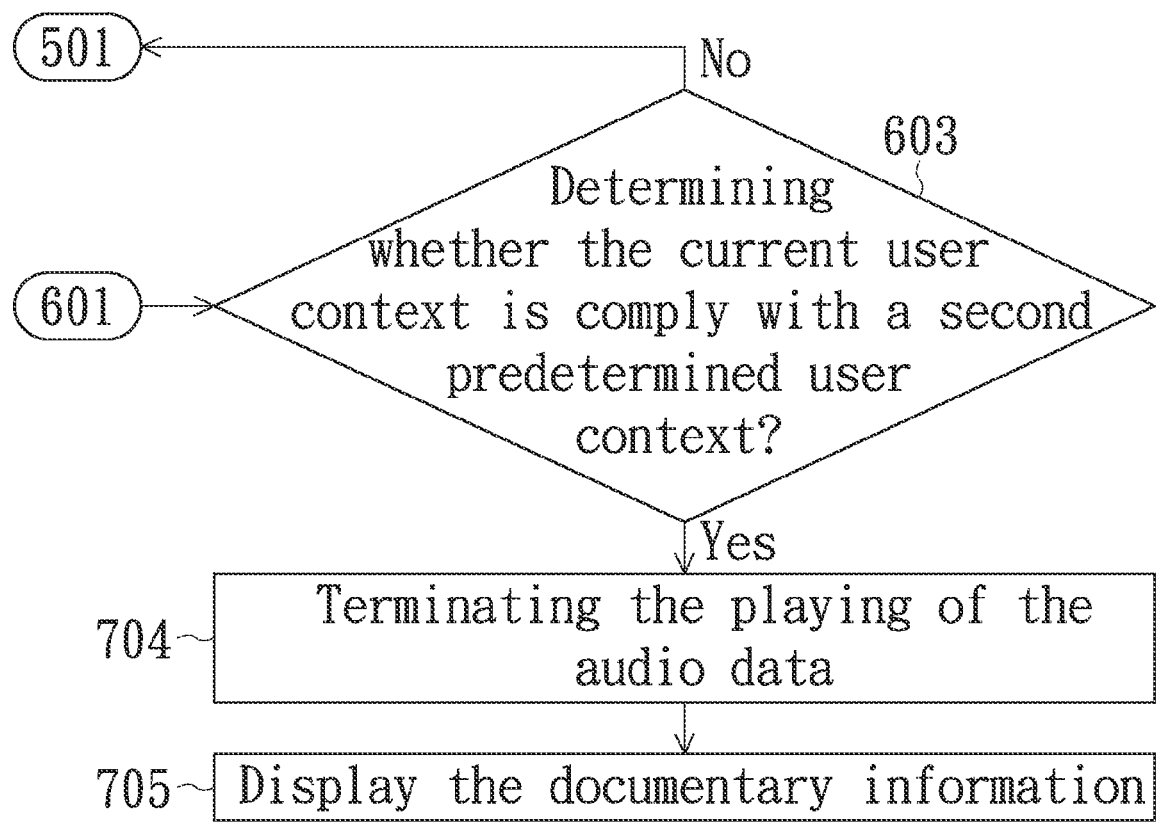

FIGS. 8A-8B are process diagrams illustrating a method for switching a current information providing mode, in accordance with the fourth embodiment of the present invention. The steps applied to the fourth embodiment are similar to that applied to one of the first, the second and the third embodiments, except as follows:

In the present embodiment, the step 701 for acquiring the documentary information displayed on the equipment is similar to that depicted in FIG. 7A; however, several steps as follows should be carried out, prior to the step 701 for acquiring the documentary information.

Referring to step 801, a start signal used to indicate the start point from which a portion of the documentary information following the start point should be converted in to audio data is generated by the start signal generating sub-module 1035 in response a user's first command.

Referring to step 701, the portion of the documentary information following the start point is acquired by the documentary information acquiring sub-module 1031.

For example, the start signal is generated to response the click operations used to get a screen point for a click a position to select a start point on the documentary information that the user is interested, and the portion of the documentary information following the start point should be converted into audio data.

In the present embodiment, since the start signal used to indicate the user device when and where to start to convert the documentary information can be directly generated by the user's click operations, thus the user can directly command the user device to convert the portion of the documentary information that he or she desires to read into audio data according to his or her own practical demands, whereby the user can obtain the audio data converted from the desired portion of the documentary information (e.g. the unread portion of the documentary information, instead of that having been read by the user).

Besides, in the present embodiment, since the documentary information is marked by the start point using the start signal generating sub-module 1035, and the portion of documentary information following the start point that the user desires to read can be converted into audio data by the documentary information acquiring sub-module 1031 and the data converting sub-module 1032, thus mere the portion of the documentary information can be converted into audio data, and the unnecessary portion of the documentary information that has been read by the user before can be omitted. As a result, the user can obtain continuous and necessary information more conveniently. For example, after a portion of a document has been read by a user, when the user device jolts badly due to vibration, shaken force or the combination thereof during the reading, a start signal can be generated immediately at the position where the user clicks, and the portion of the document following the start signal is then identified and subsequently converted into audio data. By this approach, the user can continue to obtain information from the document by the user device. In other words, the converted audio data does not comprise information about the portion of the document that has been read by the user.

Figure 9A:
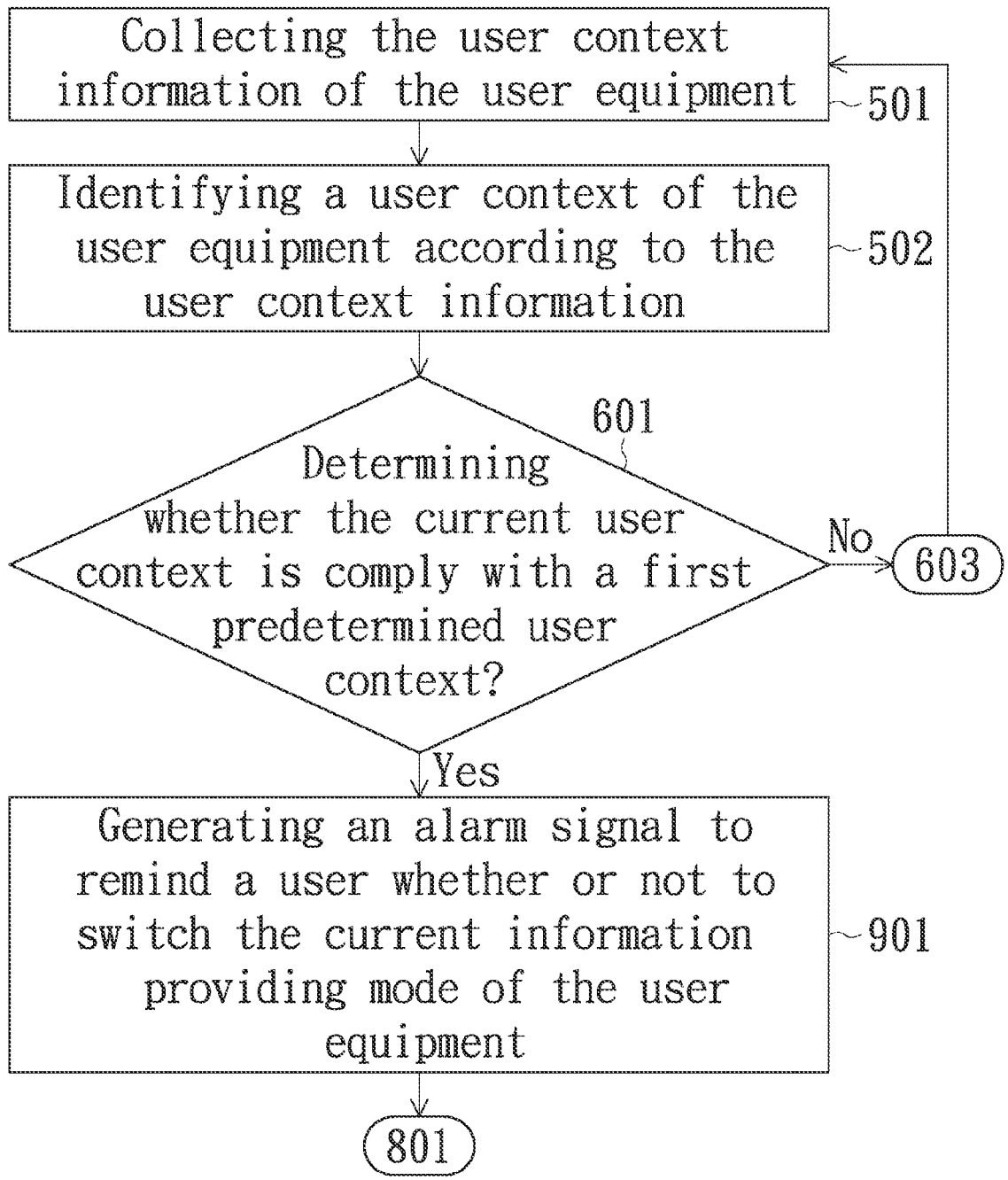
FIGS. 9A-9C are process diagrams illustrating a method for switching a current information providing mode, in accordance with the fifth embodiment of the present invention.
Figure 9B:
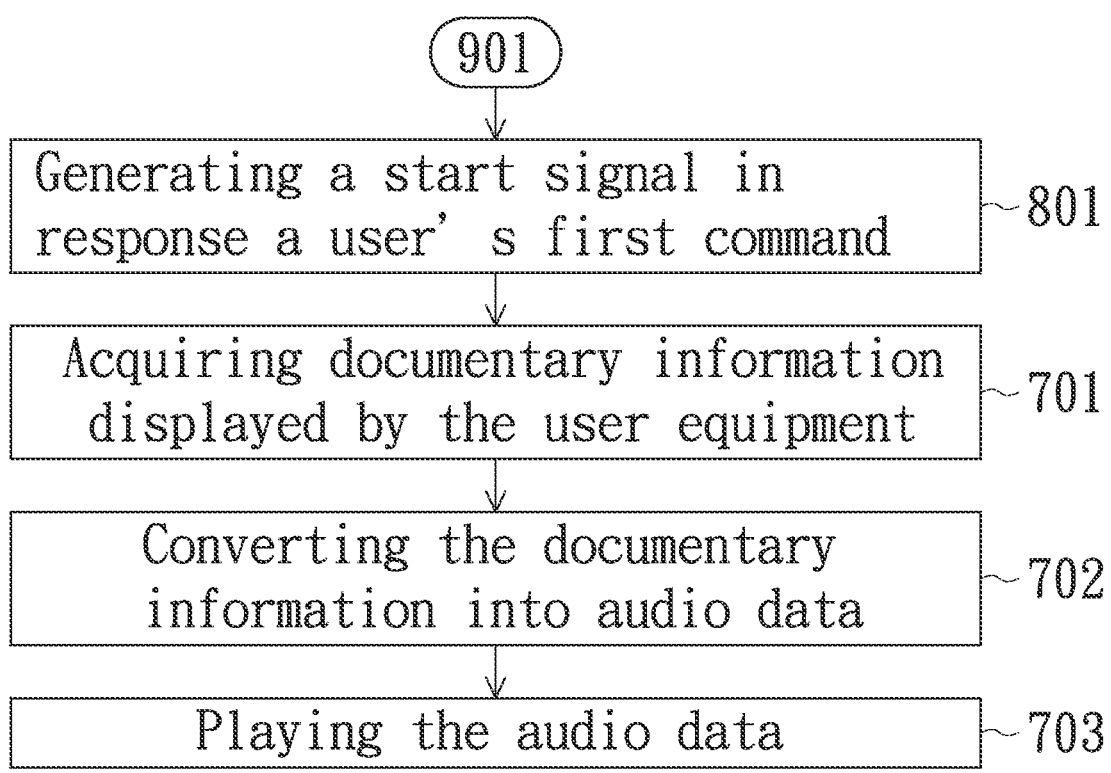
Figure 9C:
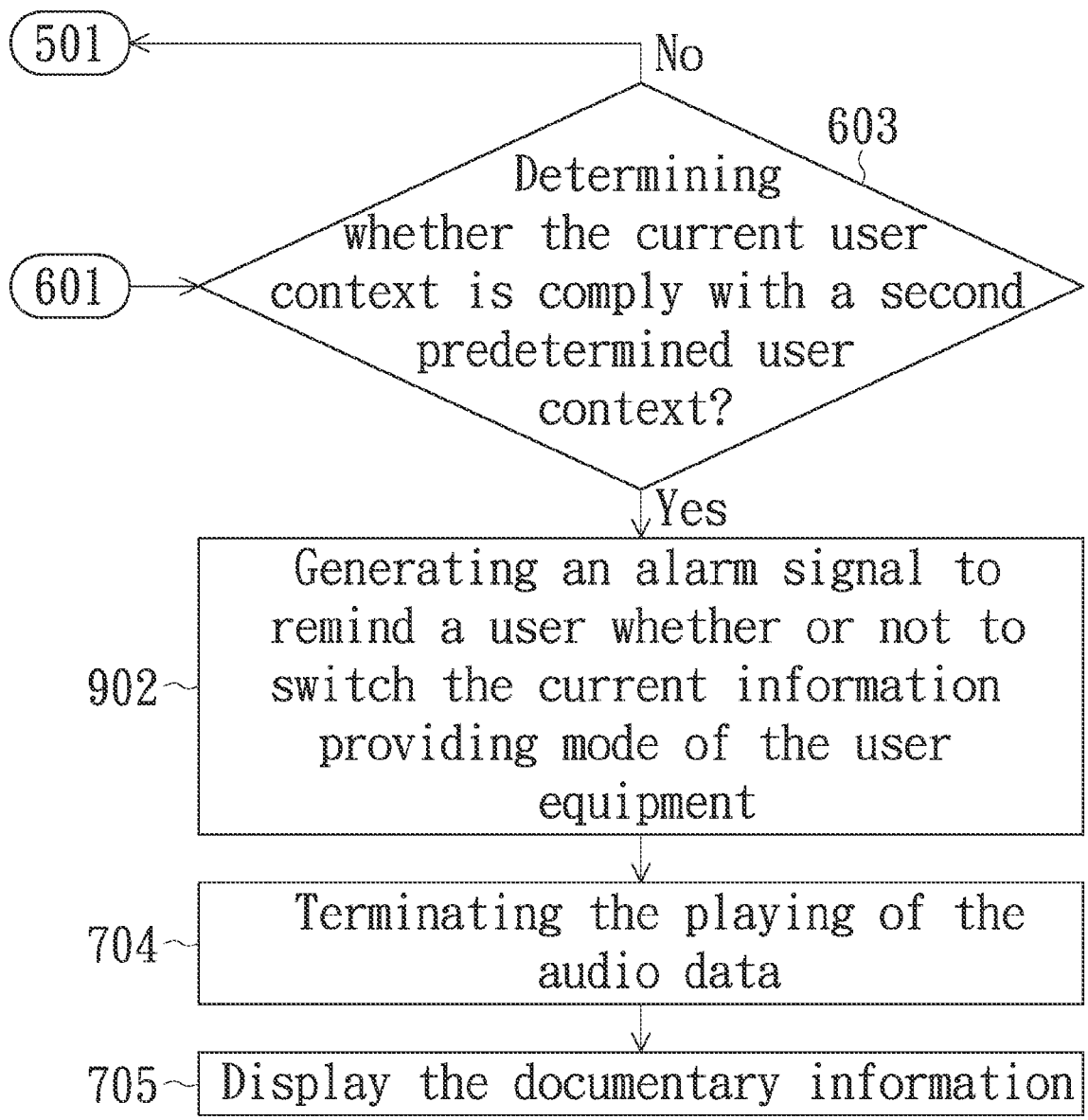

FIGS. 9A-9C are process diagrams illustrating a method for switching a current information providing mode, in accordance with the fifth embodiment of the present invention. The steps applied to the fifth embodiment are similar to that applied to one of the first, the second, the third and the fourth embodiments, except as follows:

The process for switching the current information providing mode according to the identified consequence data (similar to the step 503 depicted in FIG. 5) comprises steps as follows:

Referring to step 901, an alarm signal for warning the user is generated by the reminder module 401. In other words, the reminder module 401 is used to generate an alarm signal to remind the user whether or not to switch the current information providing mode of the user device. In practice, an alarm signal may be generated to remind the user while the identified consequence data indicates that the user device is suitable for the first level mode. The alarm signal may be provided in a text format, a picture format, an audio format or a video format. When the alarm signal is provided in a text format, text massage may be displayed on the reminder module 401. When the alarm signal is provided in a picture format, an audio format or a video format, an icon, sounds alarm or other video images may be provided by the reminder module 401.

During the process for switching the current information providing mode according to the identified consequence data, the mode switching module 103 is used to response a user's second command in corresponding to the alarm signal with a manner of switching the current information providing mode of the user device according to the identified consequence data.

In the present embodiment, since the reminder module 401 can generate an alarm signal to remind the user that the currently inspected/identified user context is comply with a predetermined user context of the user device, thus the user can switch the current information providing mode of the user device earlier to an information providing mode suitable for the current user context, so as to prevent the user from reading the documentary information on the jolty user device that may cause fatigue eyes or long-term damage to the eyes.

The methods disclosed by the first, the second, the third, the fourth and the fifth embodiments may further comprise a step of applying an initial signal receiving sub-module embedded in the user context information collecting module 101 to receive an initial signal generated by the user device.

The user context information collecting module 101 is used to collect the user context information of the user device according to the initial signal received by the initial signal receiving sub-module.

By adopting the initial signal receiving sub-module to receive the initial signal, the user context information collecting module 101 can be turn on to collect the user context information of the user device on time. In other words, the user context information of the user device is merely inspected and identified by the user context information collecting module 101 during the time interval when the documentary information is displayed on the user device; and the user context information collecting module 101 may not function to inspect the user context information of the user device when the documentary information is not displayed on the user device. Such that, the data processing loading of the user context information collecting module 101 can be significantly reduced, and the CPU and memory resource of the user device can be thus reserved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for switching a current information providing mode comprising the steps of:
   collecting user context information related to a user device;
   identifying a current user context of the user device in accordance with the collected user context information, so as to generate identified consequence data;
   switching a current information providing mode from a first mode to a second mode according to the consequence data when the current user context is complied with a first predetermined user context; and
   switching the current information providing mode from the second mode to the first mode when the current user context is complied with a second predetermined user context.

2. The method according to claim 1, wherein the first mode is a documentary information display mode; and the second mode is an audio mode.

3. The method according to claim 2, wherein the process for switching the current information providing mode from the first mode to the second mode comprises the steps of:
   acquiring documentary information displayed by the user device;
   converting the documentary information into audio data; and
   playing the audio data.

4. The method according to claim 3, wherein before the step for acquiring the documentary information is carried out, the method further comprises the steps of:
   generating a start signal used to indicate the start point from which a portion of the documentary information following should be converted into audio data in response to a user's first command; and
   acquiring the portion of the documentary information following the start point.

5. The method according to claim 3, wherein the acquired documentary information can be identified and then converted into audio data by a Text To Speech (TTS) technology.

6. The method according to claim 3, wherein the process for switching the current information providing mode from the second mode to the first mode comprises the steps of:
   halting or terminating the playing of the audio data; and
   display the documentary information.

7. The method according to claim 3, wherein the process for switching a current information providing mode suitable for the current user context of the user device according to the consequence data comprises the steps of:
   generating an alarm signal to remind a user whether or not to switch the current information providing mode of the user device; and
   switching the current information providing mode of the user device according to the identified consequence data in response a user's second command.

8. The method according to claim 4, wherein the process for switching a current information providing mode suitable for the current user context of the user device according to the consequence data comprises the steps of:
   generating an alarm signal to remind a user whether or not to switch the current information providing mode of the user device; and
   switching the current information providing mode of the user device according to the identified consequence data in response a user's second command.

9. The method according to claim 6, wherein the process for switching a current information providing mode suitable for the current user context of the user device according to the consequence data comprises the steps of:
   generating an alarm signal to remind a user whether or not to switch the current information providing mode of the user device; and
   switching the current information providing mode of the user device according to the identified consequence data in response a user's second command.

10. An device for switching a current information providing mode, comprising:
    a user context information collecting module used to collect user context information of a user device;
    a context identifying module used to identify a current user context of the user device and then generate an identified consequence data according to the user context information; and
    a mode switching module used to switch a current information providing mode according to the identified consequence data;
    wherein the current information providing mode is either a first mode or a second mode, and the mode switching module is used to switch the current information providing mode from the first mode to the second mode, when the current user context is complied with a first predetermined user context, and used to switch the current information providing mode from the second mode to the first mode, when the current user context is comply with a second predetermined user context;
    wherein the user context information collecting module, the context identifying module and the mode switching module are implemented by at least one of an element in a group consisting of: a central process unit (CPU), a memory device, a transducer/sensor, a switch device, a power supply device, a clock signal generator, and the arbitrary combinations thereof.

11. The device according to claim 10, wherein the first mode is a documentary information display mode; and the second mode is an audio mode.

12. The device according to claim 11, wherein the mode switching module comprises:
    a documentary information acquiring sub-module used to acquire documentary information displayed by the user device;
    a data converting sub-module used to convert the documentary information into audio data; and
    an audio playing sub-module used to play the audio data.

13. The device according to claim 12, wherein the mode switching module further comprises:
    start signal generating sub-module used to generate a start signal used to indicate the start point from which a portion of the documentary information following should be converted into audio data in response to a user's first command; wherein the documentary information acquiring sub-module is used to acquire the portion of the documentary information following the start point.

14. The device according to claim 12, wherein the audio playing sub-module is further used to halt or terminate the playing of the audio data while the current information providing mode is switched from the second mode to the first mode; and the mode switching module further comprises an image display sub-module used to display the documentary information.

15. The device according to claim 12 further comprising:
    a reminder module used to generate an alarm signal to remind a user whether or not to switch the current information providing mode of the user device, wherein the mode switching module is used to switch the current information providing mode of the user device according to the identified consequence data in response a user's second command.

16. The device according to claim 13 further comprising:
    a reminder module used to generate an alarm signal to remind a user whether or not to switch the current information providing mode of the user device, wherein the mode switching module is used to switch the current information providing mode of the user device according to the identified consequence data in response a user's second command.

17. The device according to claim 14 further comprising:
    a reminder module used to generate an alarm signal to remind a user whether or not to switch the current information providing mode of the user device, wherein the mode switching module is used to switch the current information providing mode of the user device according to the identified consequence data in response a user's second command.

* * * * *